US008655040B2

(12) United States Patent
Leung

(10) Patent No.: US 8,655,040 B2
(45) Date of Patent: Feb. 18, 2014

(54) INTEGRATED IMAGE REGISTRATION AND MOTION ESTIMATION FOR MEDICAL IMAGING APPLICATIONS

(75) Inventor: Henry Leung, Calgary (CA)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/808,159

(22) PCT Filed: Mar. 1, 2012

(86) PCT No.: PCT/US2012/027248
§ 371 (c)(1),
(2), (4) Date: Jan. 3, 2013

(87) PCT Pub. No.: WO2013/130086
PCT Pub. Date: Sep. 6, 2013

(65) Prior Publication Data
US 2013/0230228 A1 Sep. 5, 2013

(51) Int. Cl.
G06K 9/00 (2006.01)
G06K 9/32 (2006.01)
A61B 6/00 (2006.01)
B64D 10/00 (2006.01)

(52) U.S. Cl.
USPC ............. 382/131; 382/294; 382/132; 378/8; 600/420

(58) Field of Classification Search
USPC ............... 382/293–294, 260, 173, 128–132; 378/8, 62, 91, 95, 115; 600/407, 420, 600/431, 437
See application file for complete search history.

(56) References Cited

U.S. PATENT DOCUMENTS

| | | | |
|---|---|---|---|
| 6,360,027 B1 * | 3/2002 | Hossack et al. | 382/294 |
| 6,718,055 B1 * | 4/2004 | Suri | 382/128 |
| 7,062,078 B2 * | 6/2006 | Weese et al. | 382/131 |
| 7,187,810 B2 * | 3/2007 | Clune et al. | 382/294 |
| 7,702,064 B2 * | 4/2010 | Boese et al. | 378/8 |
| 2004/0167395 A1 * | 8/2004 | Behrenbruch et al. | 600/420 |
| 2005/0027187 A1 * | 2/2005 | Barth et al. | 600/407 |
| 2006/0165267 A1 * | 7/2006 | Wyman et al. | 382/128 |
| 2008/0056447 A1 | 3/2008 | Boese et al. | |
| 2009/0275831 A1 | 11/2009 | Hall et al. | |
| 2011/0299755 A1 | 12/2011 | Zou et al. | |

OTHER PUBLICATIONS

International Search Report & Written Opinion dated Nov. 30, 2012 in PCT Application No. PCT/US12/27248.

(Continued)

Primary Examiner — Andrae S Allison
(74) Attorney, Agent, or Firm — Hope Baldauff, LLC

(57) ABSTRACT

Technologies are described herein for generating a diagnostic three dimensional image for a patient. Some example technologies may obtain a sequence of multiple images of the patient using an imaging modality device. The technologies may estimate a registration vector for each image based on a motion function and an image transformation function. Each image may be defined by a measurement noise added to the image transformation function operating on the registration vector with respect to a reference image. The registration vector may be a function of a breathing motion of a prior registration vector added to a transition noise value. The technologies may estimate motion parameters based on the registration vector. The technologies may iteratively refine the registration vector and the motion parameters. The technologies may generate the diagnostic three dimensional image of the patient using the registration vector for each image and the motion parameters.

31 Claims, 6 Drawing Sheets

(56) References Cited

OTHER PUBLICATIONS

S. Shimizu, H. Shirato, K. Kagci, T. Nishioka, X. Bo, H. Dosaka—Akita, S. Hashimoto, H. Aoyama, K. Tsuchiya, and K. Miyasaka, "Impact of respiratory movement on the computed tomographic images of small lung tumors in 3D radiotherapy," Int. J. Radiat. Oncol., Bilo., Phys., vol. 46, pp. 1127-1133, 2000.

J. Hanley, M. M. Debois, D. Mah, et al, "Deep inspiration breath—hold technique for lung tumors: The potential value of target immobilization and reduced lung density in dose escalation," Int. J.Radiat. Oncol. Biol. Phys., vol. 45, pp. 603-611, 1999.

J. W. Wong, M.B. Sharpe, D.A. Jaffray, et al, "The use of active breathing control to reduce margin for breathing motion," Int. J.Radiat. Oncol. Biol. Phys., vol. 44, pp. 911-919, 1999.

Q.S. Chen, M.S. Weinhous, F.C. Deibel, et al, "Fluoroscopic study of tumor motion due to breathing: Facilitating precise radiation therapy for lung cancer patients," Med. Phys., vol. 28, pp. 1850-1856, 2001.

G.C. Sharp, S.B. Jiang, S. Shimizu, et al, "Prediction of respiratory tumour motion for real-time image-guided radiotherapy," Phys. Med. Biol., vol. 49, pp. 425-440, 2004.

S.S. Vedam, P.J. Keall, V.R. Kini, et al, "Acquiring a four-dimensional computed tomography dataset using an external respiratory signal," Phys. Med. Biol., vol. 48, pp. 45-62, 2003.

D. A. Low, P. J. Parikh, W. Lu, J. F. Dempsey, S. H. Wahab, J. P. Hubenschmidt, M. M. Nystrom, M. Handoko, and J. d. Bradley, "Novel breathing motion model for radiotherapy," Int. J. Radiat. Oncol., Biol., Phys. vol. 63, pp. 921-929, 2005.

R.D. Tarver, D.J. Conces, and J.D. Godwin, "Motion artifacts on CT Simulate Bronchiectasis," Am. J. Roentgenol., vol. 151, pp. 1117-1119, 1988.

D. Huang and H. Leung, "Maximum likelihood state estimation of semi-Markovian switching system in non-Gaussian measurement noise," IEEE Trans Aerospace and Electronic System, vol. 46, pp. 133-146, 2010.

Kalman Filter—Wikipedia, the free encyclopedia, http://en.wikipedia.org/wiki/Kalman_filter; Sep. 16, 2013, pp. 1-27.

\* cited by examiner

INTEGRATED IMAGE REGISTRATION AND MOTION ESTIMATION FOR MEDICAL IMAGING APPLICATIONS

BACKGROUND

Unless otherwise indicated herein, the materials described in this section are not prior art to the claims in this application and are not admitted to be prior art by inclusion in this section.

Non-invasive image data is frequently obtained to generate three dimensional images of a patient that are used by medical personnel for treating various medical disorders. Treatment regimens are predicated on generating an accurate image of the patient. In various situations, three dimensional images of the patient, such as the lung area, may be impacted by movement of the patient, due to breathing or cardiovascular movement. Various attempts to improve the accuracy of localizing the region to be treated have been proposed, such as attempting to control the patient's breathing or coordinating breathing with the timing of obtaining the image data.

SUMMARY

The present disclosure generally pertains to improving registration accuracy of a sequence of three dimensional images generated of a patient by taking into account that the image sequence may reflect motion of a subject area, such as breathing motion exhibited in the patient's lungs. In various implementations, this may be accomplished using an iterative process for transferring a motion state of the targeted area from a first time instance to another time instance, and using the three dimensional image acquired at the first time instance to measure a change, if any, to the motion state of the targeted area. As the three dimensional images are acquired sequentially, the motion parameters of the targeted area can be refined in accordance with any measured changes such that the registration accuracy of the three dimensional images to a reference model, such as a human body, can be improved.

The present disclosure generally describes some example methods adapted to generate a diagnostic three dimensional image of a patient. Such methods can be utilized to generate a single diagnostic three dimensional image or a sequence of diagnostic three dimensional images. Example methods may obtain multiple images of the patient using an imaging modality device. Each image may be obtained at a given time in sequence. Example methods may estimate a registration vector for each image at the given time based on a motion function and an image transformation function. Each image may be defined by a measurement noise occurring at the given time added to the image transformation function operating on the registration vector with respect to a reference image. The registration vector may be a function of a breathing motion of a prior registration vector added to a transition noise value at the given time. The technologies may estimate motion parameters based on a sequence of estimated registration vector. Example methods may iteratively refine the estimated registration vector and the estimated motion parameters. When the estimated registration vector and the estimated motion parameters have been iteratively refined, example methods may generate the diagnostic three dimensional image of the patient using the estimated registration vector for each image at the given time and the estimated motion parameters.

The present disclosure generally also describes some example systems adapted to generate a diagnostic three dimensional image of a patient. Such systems can be utilized to generate a single diagnostic three dimensional image or a sequence of diagnostic three dimensional images. Example systems may include a non-invasive imaging device configured to obtain multiple images of the patient using an imaging modality device. Each image may be obtained at a given time in sequence. Example systems may further include a processor, a memory coupled to the processor, and a diagnostic imaging module which executes in the processor from the memory. The diagnostic imaging module, when executed by the processor, may cause the processor to perform one or more operations. The diagnostic imaging module may cause the processor to estimate a registration vector for each image at the given time based on a motion function and an image transformation function. Each image may be defined by a measurement noise occurring at the given time added to the image transformation function operating on the registration vector with respect to a reference image. The registration vector may be a function of a breathing motion of a prior registration vector added to a transition noise value at the given time. The diagnostic imaging module may cause the processor to estimate motion parameters based on a sequence of estimated registration vector. The diagnostic imaging module may cause the processor to iteratively refine the estimated registration vector and the estimated motion parameters. When the estimated registration vector and the estimated motion parameters have been iteratively refined, the diagnostic imaging module may cause the processor to generate the diagnostic three dimensional image of the patient using the estimated registration vector for each image at the given time and the estimated motion parameters.

The present disclosure generally further describes some computer-readable media having computer-executable instructions stored thereon which, when executed by a computer, cause the computer to perform one or more operations. Example computer-readable media may cause the computer to obtain multiple images of a patient using an imaging modality device. Each image may be obtained at a given time in sequence. Example computer-readable media may cause the computer to estimate a registration vector for each image at the given time based on a motion function and an image transformation function. Each image may be defined by a measurement noise occurring at the given time added to the image transformation function operating on the registration vector with respect to a reference image. The registration vector may be a function of a breathing motion of a prior registration vector added to a transition noise value at the given time. Example computer-readable media may cause the computer to estimate motion parameters based on a sequence of estimated registration vector. Example computer-readable media may cause the computer to iteratively refine the estimated registration vector and the estimated motion parameters. When the estimated registration vector and the estimated motion parameters have been iteratively refined, example computer-readable media may cause the computer to generate a full volume reference diagnostic image of the patient using the estimated registration vector for each image at the given time and the estimated motion parameters.

The present disclosure generally further describes some example methods adapted to form a radiation treatment plan. Example methods may obtain a multiple images of a patient using an imaging modality device. Each image may be obtained at a given time in sequence. Example methods may estimate a registration vector for each image at the given time based on a motion function and an image transformation function. Each image may be defined by a measurement noise occurring at the given time added to the image transformation function operating on the registration vector with respect to a reference image. The registration vector may be a function of a breathing motion of a prior registration vector added to a transition noise value at the given time. Example methods may estimate motion parameters based on a sequence of estimated registration vector. Example methods may iteratively refine the estimated registration vector and the estimated motion parameters. When the estimated registration vector and the estimated motion parameters have been iteratively refined, example methods may generate a full volume reference diagnostic image of the patient using the estimated registration vector for each image at the given time and the estimated motion parameters. Example methods may determine a radiation dosage of a radiation beam that is applied to the patient based on the full volume reference diagnostic image. The radiation dosage of the radiation beam may form at least part of the radiation treatment plan.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
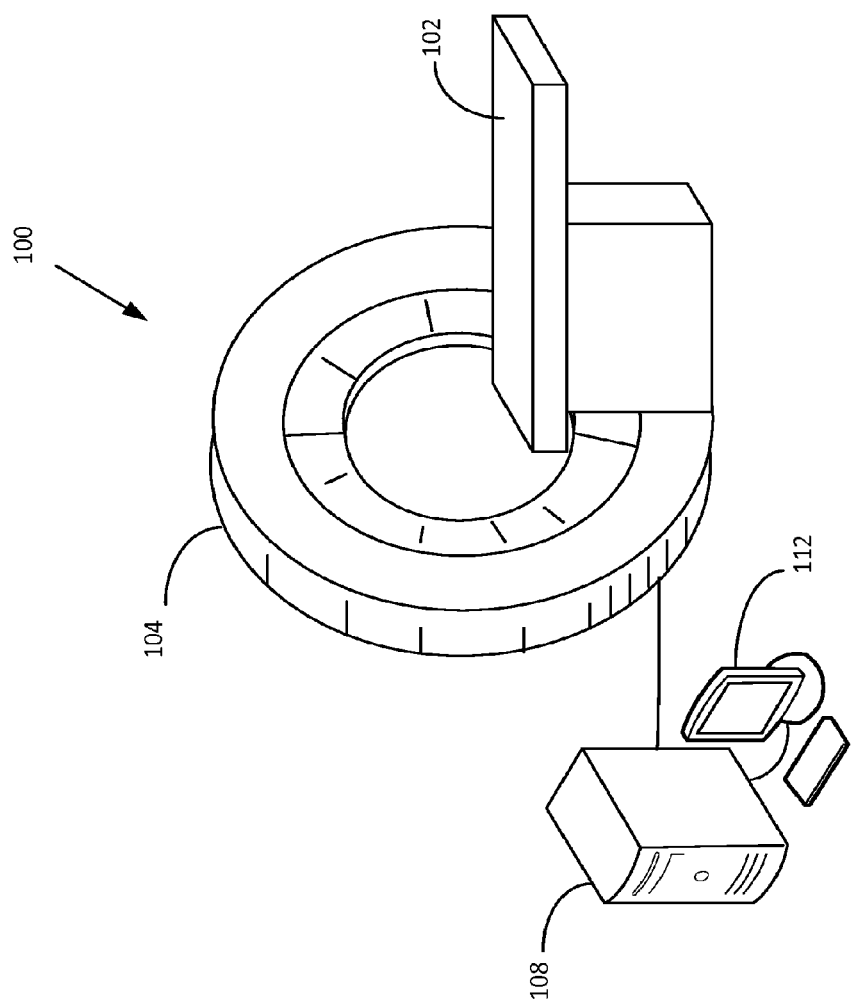
FIG. 1 is a diagram illustrating an example system adapted to obtain images of a patient and estimate a state of a registration vector and motion parameters.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings, and claims are not meant to be limiting. Other embodiments may be utilized, and other changes may be made, without departing from the spirit or scope of the subject matter presented herein. It will be readily understood that the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies adapted to improve a registration accuracy of three dimensional ("3-D") images used in medical applications. Such technologies may include methods for better estimating the motion of an organ, or parts thereof, which is undergoing non-invasive imaging. According to various embodiments, registration accuracy can be improved by applying at least two models, a state transition model and a measurement model, to existing imaging modalities. The state transition model of a registration vector may describe a breathing model of the patient's lung. The measurement model may describe how images acquired by the imaging modalities are affected by the breathing motion.

A number of non-invasive imaging techniques have been developed for use in diagnosis and treatment in medicine. Technologies for obtaining non-invasive images of a patent may include computed tomography ("CT") scans, X-rays, positron emission tomography ("PET") scans, magnetic resonance imaging ("MRI") scans, and ultrasound scans. Each technique generally relics on generating waves of some form, detecting the reflected or scattered waves, and processing the detected results in some manner to display an image. Most of these technologies have been adapted to obtain, store, and process the image data as digital data so that the images can be stored and manipulated by a computer processing system. Hence, the images may be displayed on display devices, as opposed to being viewed, for example, on exposed films.

In certain cases, images obtained from a patient may be taken at a series of points along a portion of the patient. For example, CT scanning may involve the patient lying on a moving bed (also referred to as a couch) that slides the patient through a scanner. The images obtained may represent a two-dimensional ("2-D") "slice" or cross-sectional view of the body. By obtaining a series of images along the length of the body, a three dimensional view can be generated. As the series of images are being obtained, parts of the patient, such as the patient's lungs, may exhibit movement caused by normal breathing or normal cardio activity. Such movement may cause inconsistencies between images obtained in the series.

The image data can be used to diagnose a condition, such as the presence of a tumor or cancer in the patient. In addition, the image data can be used for the purposes of developing a radiation therapy plan. In conventional radiation therapy, treatment may involve directing radiation to the tumor to kill the tumor cells. The radiation plan may determine how the radiation should be provided for the particular patient, including where the radiation beam should be positioned on the patent, how much radiation should be delivered, how long the exposure should be, how many sessions are required, etc. Typically, the doses are provided over several treatment sessions covering a few days, which are called "fractions", because a single large dose of radiation would be harmful to surrounding non-tumorous cells.

A goal of radiation treatment may be to minimize collateral damage to the surrounding, non-tumorous cells when delivering radiation treatment. Thus, the size and dose of radiation may be carefully determined based on the size and location of the tumor, which is ascertained by the previously obtained images. It may be desirable to present accurately registered images to medical personnel. Aside from defining treatment regimens, accurately registered images may be useful or necessary to diagnose and measure the efficacy of the treatments.

The registration accuracy of the images can depend on the physiological structures themselves. For example, bone may be a relatively stable structure and its contours may be relatively easy to identify in an image. Further, a bone's shape usually does not change over a few seconds or over a few hours. As a result, variations between each image in a series of images of the bone structure may be limited.

However, other physiological structures are more plastic and dynamic. Soft tissue is flexible, and may inherently involve movement over a time period. For example, the heart is always beating and the lungs are generally moving, except for brief periods of a patient's voluntary cessation of breathing. Obtaining an accurately registered image of a portion of a lung (e.g., where a lung tumor exists) can be difficult due to the patient's breathing.

Measuring a particular point on a lung over time will exhibit a movement called a breathing motion. The path taken by the particular point during a breathing cycle may be nonlinear and the breathing motion can vary from one breathing cycle to another. One approach to minimize this variation is to have patients attempt to breath at the same rate, but invariably a deeper breath will occur. Another approach to improve the registration accuracy is to have the patient hold their breath while obtaining the image. However, there are obvious limitations as to how long a healthy person can hold their breath, and for a patient with lung disease, compliance by the patient is made all the more difficult.

Other techniques to improve the registration accuracy of the image obtained involve "gating." Gating involves timing when the image is taken in conjunction with the patient's breathing cycle. For example, a person having a regular breathing pattern will have a point of full exhalation and full inhalation at periodic times every few seconds in each breathing cycle. These points can be monitored and predicted, and images can be taken, e.g., only at each point of full inhalation. In this manner, the effects of breathing motion are attempted to be minimized to obtain a more accurately registered image.

CT is a common means to obtain diagnostic images for medical purposes. Some other imaging technologies, such as PET, MRI, and ultrasound are similar forms of non-invasive imaging technology. For purposes of illustration, but not limitation, the examples disclosed herein focus on using CT technology for medical applications, although other imaging technologies could be used. CT scans may produce images aiding in diagnosis of a condition, e.g., detect an abnormality such as a tumor, measure the efficacy of treatments, develop a radiation treatment plan, etc.

In some examples presented herein, the CT scans involve lung images. Presenting an accurately registered image of the lung, and any tumors therein, can be challenging because the lung is typically in motion. While a patient may be able to hold their breath at points when an image is obtained (a process called "gating"), the ability for a healthy person to hold their breath is limited, and even more limited those patients with abnormal lung conditions. Further, areas in the lung being scanned may be subject to movement by the heart or cardiovascular system, which can impact movement of lung tissue. While patients may be able to control breathing on a limited basis, patients cannot voluntarily suspend the cardiovascular system.

FIG. 1 is a diagram illustrating an example imaging apparatus 100 adapted to obtain images of a patient and estimate a state of a registration vector and motion parameters, arranged in accordance with at least some embodiments presented herein. In FIG. 1 the imaging apparatus 100 includes a gantry 104 that houses an X-ray generator and receiver, the exact configuration and operation of which is not relevant to the principles of the present disclosure. The patient may lie or otherwise be positioned on a couch 102. The imaging apparatus 100 may include a mechanism adapted to move the patient horizontally while the imaging apparatus 100 obtains the images. The imaging apparatus 100 may be adapted to produce, at regular periodic time intervals, a set of data representing of 2-D images representing cross-sections of the patient's body. These may be referred to interchangeably as "image segments" or "images". Such image segments or images may depict useful data of the patient's body. In some cases, such image segments or images may also depict the surrounding area outside of the patient's body, which may be discarded during processing.

In some embodiments, the imaging apparatus 100 may be adapted to produce 2-D image segments at a rate of about five image segments per second. The imaging apparatus 100 may be adapted to provide the image data to an operator console 108 housing a processor configured, in part, to process the image data. A display terminal 112 may be adapted to present the resulting images. The displayed images can be a single image segment of the two-dimensional data, or a three dimensional representation of the lung organ, generated from the series of the two-dimensional images.

Figure 2:
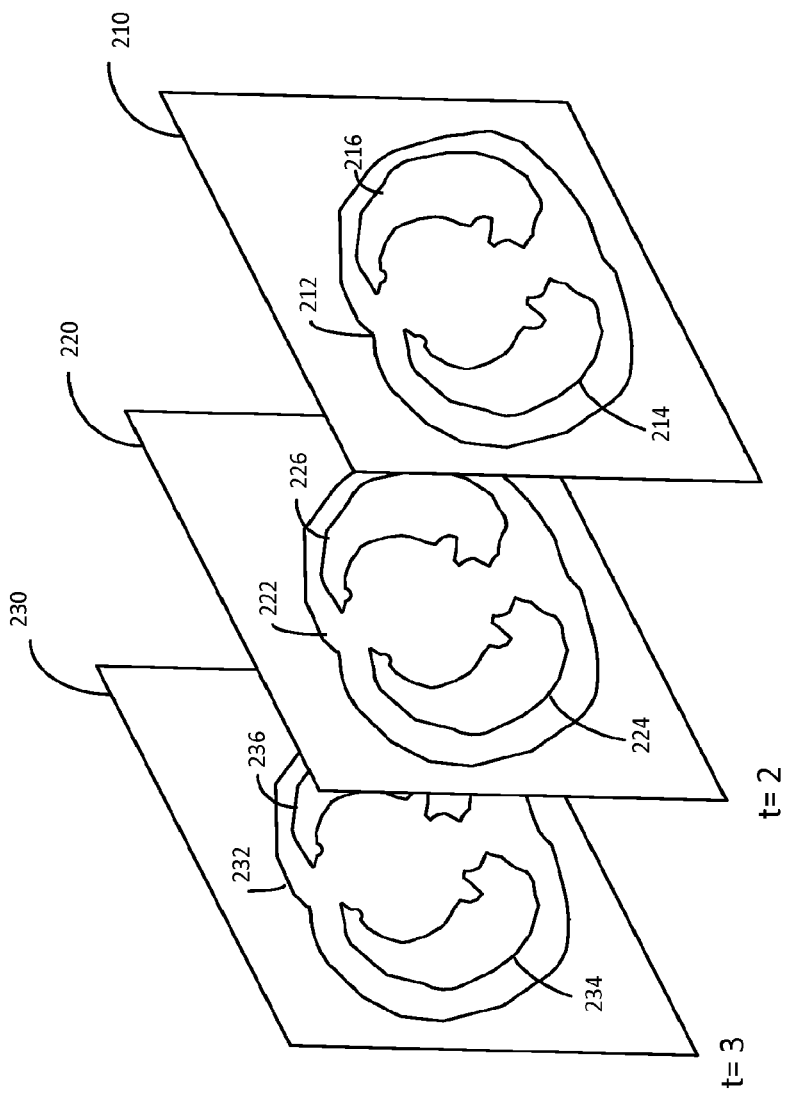
FIG. 2 is a diagram illustrating a logical representation of the image segment data that can be produced by the imaging apparatus.

FIG. 2 is a diagram illustrating a logical representation of the image segment data produced by the imaging apparatus 100, arranged in accordance with at least some embodiments presented herein. Image segments 210, 220, 230 may be generated at various periodic time intervals according to the imaging scanning rate. Thus, each image segment can be notated as $I_t$ for the image generated at time t. The first image segment 210, $I_1$, may be considered as a reference image, although any image segment could be, in theory, the reference image. Generally, a positive time progression is assumed so the first image segment is typically used as the reference image.

By way of example, the first image segment 210 may represent one of a series of cross section images of the chest area of the patient. The outlines of two lungs 214 and 216 are shown in cross section 212. In some embodiments, the image obtained at this time may occur at any point during the patient's normal breathing cycle. In some other embodiments, the image segments obtained could be gated. That is, the images may be obtained at certain times that are correlated with a maximum, minimum, or mid-point of the patient's normal breathing cycle.

FIG. 2 depicts a series of image segments over time, with the image segment at t=2 shown as the second image segment 220, $I_2$, and the image segment at t=3 shown as the third image segment 230, $I_3$. Because the patient may be on the horizontal moving couch while the images are obtained, the second image segment 220 at t=2 may represent a different, but adjacent image of the patient compared to the first image segment 210 at t=1. A cross section 222 of the chest area of the patient can be observed, which includes an image of a left lung 224 and a right lung 226. Additional image segments, such as the third image segment 230, may be obtained for other subsequent times. The third image segment 230 may include a cross section 232 of the chest area of the patient, a left lung 234, and a right lung 236. There may be dozens of such image segments produced for a single patient, each of which is taken at a slightly different time and location of the patient.

The image shown in each respective image segment $I_t$ may be of a different size or shape relative to the previous or subsequent image segment ($I_{t-1}$ or $I_{t+1}$). As noted, the patient may be breathing and the shape of the lung may change over time due to the breathing. Second, as the patient may be moving, each scan may represent a slightly different view of the lung. Consequently, each image segment may be slightly different than the adjacent image.

A conventional approach for analyzing the image segments may involve a manual, visual comparison of two sets of adjacent image segments, e.g., viewing the first image segment 210 and the second image segment 220 side-by-side or superimposed. Superimposing the outlines of the image segments 210, 220 may facilitate distinguishing the two.

Another approach for analyzing the image segments is to rely on a computerized image processing system to generate a 3-D image based on the series of 2-D image segments. In order to generate an accurate third dimensional image, it may be necessary for the image processing system to "register" the images in order to construct the 3-D image. Registering involves mapping certain points from one image segment to the next image segment.

Figure 3:
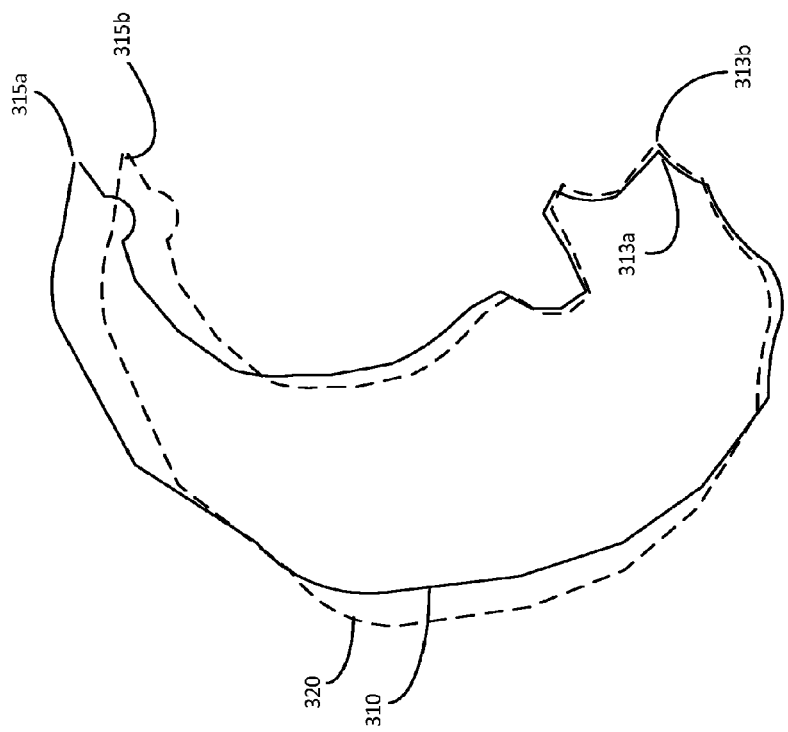
FIG. 3 is an illustration of two example images superimposed for the purpose of performing registration of the images.

FIG. 3 is an illustration of two example images superimposed for the purpose of performing registration of the images, arranged in accordance with at least some embodiments presented herein. Superimposing the images may involve positioning the two images to align certain readily distinguishable points called "landmark points" or "control points." A control point is typically any easily distinguishable or identifiable location on the image. For example, a control point can represent an apex point where the outline is convex or concave. Typically two or more control points are used to register images. The control points may be useful in positioning the two images relative to each other in order to quickly ascertain the differences. Although the control points are shown for illustration purposes in FIG. 3 at the contour of the lung image, it may be possible to have control points associated with features inside the lung as well.

FIG. 3 illustrates a control point 315a on a first outline 310 of a lung and a corresponding control point 315b on a second outline 320 of the lung. These corresponding control points 315a, 315b may not exactly coincide with each other. However, looking at another set of corresponding control points, namely control point 313a and control point 313b, these points appear to almost coincide. Because the two images may not be exactly the same, it follows that at least some of the control points, such as the control points 315a, 315B, as well as the two outlines 310, 320 may not exactly overlap.

In order for the image processing system to create an accurate 3-D diagnostic image for presentation, the control points need to be aligned along the entire sequence of images. Proper alignment of the control points promotes accurate development of an accurately aligned 3-D image. This process is called "image registration." Alignment of the control points may be complicated because the outline of the lung may be affected by the inherent breathing motion of the patient's lungs. Furthermore, selection of control points with good quality may require extensive experience and may involve tedious, manual work.

Without compensating for the movement of the lung, an image segment at one location of the lung may be obtained, for example, at maximal inhalation and the next image segment may be obtained at minimal inhalation. Generating the 3-D image of the lung without any compensation would generate a distorted depiction of the lung because of the movement of the lung.

One approach to address this issue is to simultaneously obtain lung measurements (also referred to as "spirometry" measurements) during the imaging procedure. The volume of air inhaled/exhaled (also referred to as "tidal volume") can be measured, along with the airspeed to generate a cyclical chart of the breathing cycle. The image segments may be obtained over time and over various positions of the patient's chest area. In some embodiments, the image segments may be obtained while the spirometry measurements are obtained in order to facilitate the correlation of the breathing measurements with the images. The imaging apparatus may obtain five image segments per second, and over a number of breathing cycles. The imaging apparatus may obtain a number of image segments at the periodic, maximum inhalation point. Similarly, a number of image segments may be obtained at the periodic, minimum inhalation point. The image segments may be then categorized into groups in a process called "binning" where the groups are called "bins". Thus, all of the images taken at the same tidal volume can be used to generate a composite, full volume reference image.

It is possible to register each of the individual image segments to the composite full volume reference image to determine motion of the lung, or "image motion." Once the image motion of the lung is determined, a pre-defined breathing motion model can be used to compute the breathing motion. However, this approach assumes that image registration and motion estimation are two independent processes. In reality, image registration and motion estimation may be inter-related. The presence of breathing motion in the scanning process can cause a change of pixel position along with artifacts and distortions in the scanning images. Although image registration can help to estimate breathing motion, it is under the assumption that the registration error is zero, which may not occur due to the noise introduced by imperfect imaging devices. Consequently, any estimation of the breathing motion may be inaccurate because of inaccurate image registration. In other words, image registration and breath motion estimation may be two interlaced processes. If the breathing motion can be estimated precisely, the distortion that it causes can be compensated during the registration process, leading to more accurate 3-D images.

Some embodiments may address this situation by defining the breathing motion as a dynamical function of registration parameters. The registration parameters may include translations and/or rotations of the image coordinates at time t that when applied produce the image coordinates at t+1. In other words, knowing the registration parameters at time t and the dynamical function of the breathing motion allow the image coordinates to be determined at t+1. For example, referring to FIG. 3, each point on one image can be translated to a corresponding point on the other image by applying the appropriate breathing motion function.

The registration vector, which may include several registration parameters, such as rotation and translation parameters, at a given time for an image can be denoted as $\rho(t)$. The relationship between the registration vector and the breathing motion function can be described by equation 1, below:

$$\rho(t)=F(\rho(t-1))+w(t) \qquad \text{eq. (1)}$$

where the function F is a pre-defined motion function describing the state transition of $\rho(t)$ from t−1 to t. The variable w(t) is transition noise encountered at time t. In other words, the motion function F(•) applied to the registration vector at t−1 defines the registration vector at time t.

The breathing motion function F as determined for a human lung organ can be a modeled according to equations known in the art. One expression of the motion function can be provided by equation 2, below:

$$F(\rho(t-1))=\alpha\rho(t-1)V+\beta\rho(t-1)\epsilon+\gamma \qquad \text{eq. (2)}$$

where V represents the tidal volume of the patient, $\epsilon$ is the airflow rate, and $\alpha$, $\beta$, and $\gamma$ are model parameters. Equation 2 indicates that the tidal volume and the airflow rate of the patient can be used to define the breathing motion function. In light of equation 1, the tidal volume and airflow rate (along with the other model parameters) defining the breathing motion function and can be used on a current registration vector, $\rho(t-1)$ to define the following registration vector, $\rho(t)$.

Applying equation 2 in the context of equation 1 is shown below in equation 3:

$$\rho(t)=\alpha\rho(t-1)V+\beta\rho(t-1)\epsilon+\gamma+w(t) \qquad \text{eq. (3)}$$

The issue then becomes one of estimating ρ(t) and α, β, and γ. Recall that w(t) is transition noise. The estimation of these parameters can occur considering that an acquired image at time t, denoted as $I_m(t)$, is a transformation function applied to the reference image, where the reference image is defined as previously described. More specifically, this can be illustrated by equation (4):

$$I_{m(t)}=H(\rho(t),I)+v(t) \qquad \text{eq. (4)}$$

where I is the reference image and v(t) is measurement noise at time t.

In some cases the transformation function H may be a linear or rigid transformation of the reference image I. If so, the transformation function may be given by equation 5, shown below:

$$H(\rho(t),I)=R(t)\cdot I+T(t) \qquad \text{eq. (5)}$$

where ρ(t)=[R(t), T(t)], R(t) is a rotation parameter and T(t) is a translation parameter. In other cases, the transformation function H(•) may be non-linear.

Estimation of the state ρ(t) and the parameters α, β, and γ may be performed using the dynamical model of equation 1 and the measurement model given in equation 4. This may involve using various well-known estimation methods, including a maximum likelihood approach based on expectation maximization or a maximum a posterior ("MAP") approach, based on a variational Baycsian.

If an expected maximization approach is used, estimation of the state ρ(t) as well as the parameters α, β, and γ may involve two steps. These may include the E-step and the M-step. In the E-step, a standard Kalman filter can be used to estimate ρ(t) and its covariance with the current estimate of α, β, and γ, when the transformation function H(•) is linear. If the motion function H(•) is non-linear, an extended Kalman filter can be used to estimate ρ(t) and its covariance with the current estimate of α, β, and γ. Then in the M-step, the estimates of α, β, and γ may be updated by maximizing the expected log-likelihood function with the estimated ρ(t) obtained from the E-step. The E-step and M-step may iterate until the expected log-likelihood function is converged.

Thus, as applied to the present application, the estimation of the breathing motion parameters (α, β, and γ) may be improved based on a sequence of estimated registration vectors. Furthermore, the registration vector ρ(t) may be iteratively refined with the updated estimates of the breathing motion parameters. Once accurate estimation of the registration vectors and the motion parameters are obtained, the position and orientation of the newly obtained image relative to the reference image can be computed using Eq. (5) if the image transformation function is linear. With the known positions and orientations, the sequentially obtained 2-D segments can be used to construct a more precise 3-D image.

Figure 4:
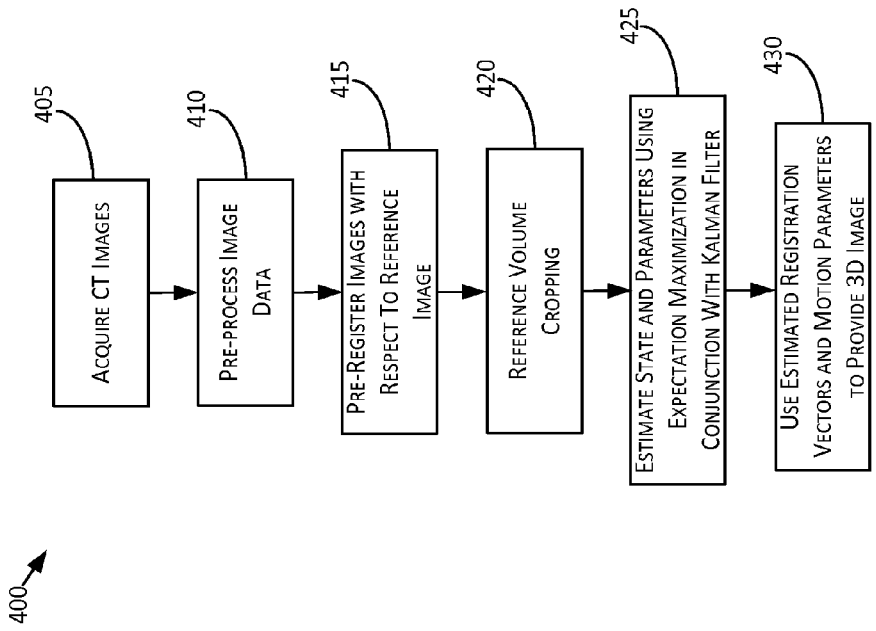
FIG. 4 is a flow diagram illustrating an example process adapted to improve the registration accuracy of the acquired three dimensional images relative to a reference image.
Figure 5:
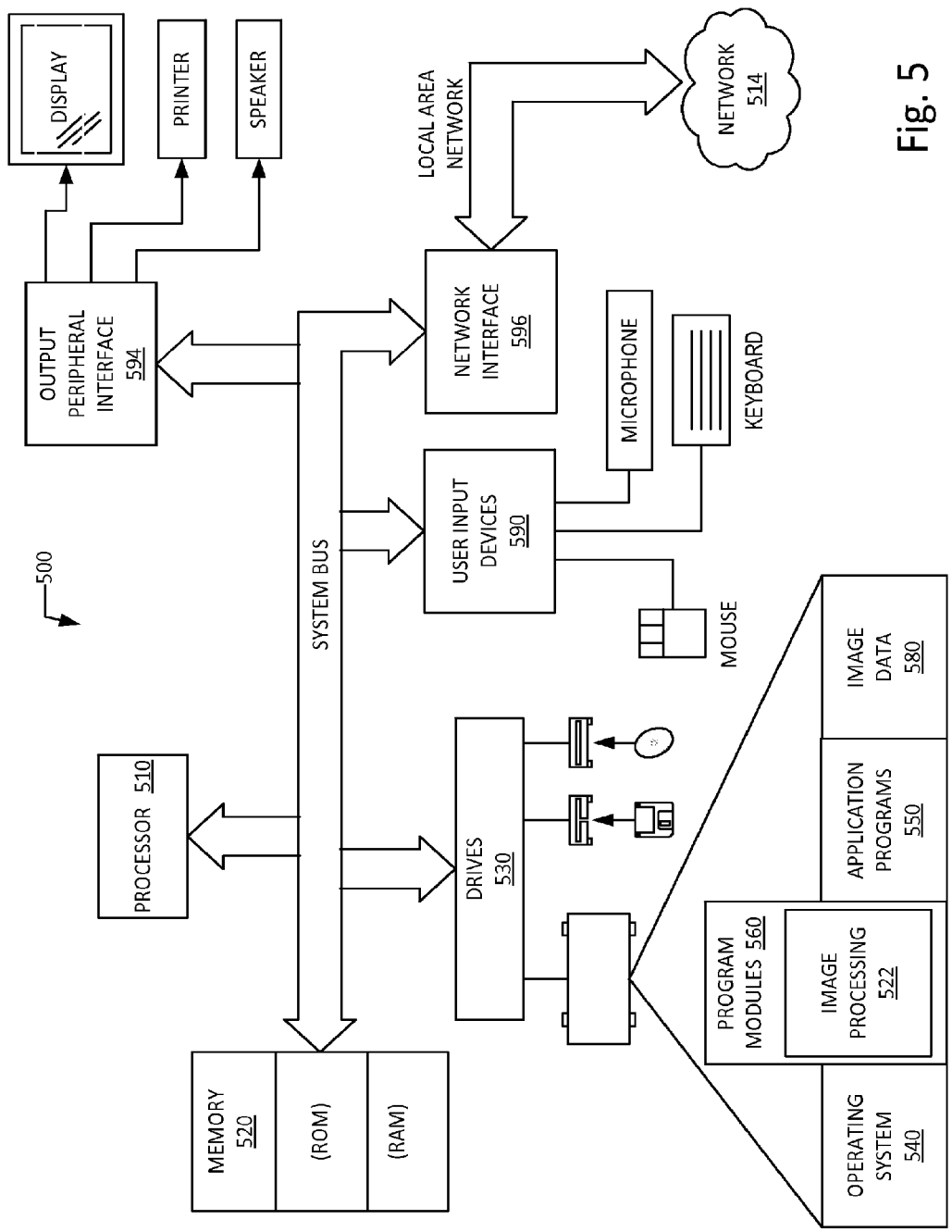
FIG. 5 is a block diagram of a computer hardware architecture for an example computing system.

FIG. 4 is a flow diagram illustrating an example process 400 that may be performed by an image processing program module, such as an image processing program module 522 illustrated in FIG. 5, adapted to improve the registration accuracy of the acquired three dimensional images relative to a reference image, arranged in accordance with at least some embodiments presented herein. The process 400 may include various operations, functions, or actions as illustrated by one or more blocks 405 through 430.

The process 400 may begin with the block 405 (Acquire CT Images) where a CT scanner or other imaging apparatus may be configured to obtain a series of CT image segments. In some embodiments, as the patient is progressively moved through the CT scanner, the CT scanner may be adapted to obtain a series of time and position dependent images of the patient. As noted, other imaging technologies capable of obtaining such images could be used.

Each high resolution of the image segment may contain a significant number of voxels (i.e., 3-D pixel information) that may not be relevant to the patient. Specifically, these voxels may be image pixels outside of the patient's body. To reduce the computational processing performed by the image processing program module, the image processing program module may be configured to perform some pre-processing techniques. Block 405 may be followed by block 410.

At block 410 (Pre-process Image Data), the image processing program module may be configured to pre-process the obtained images for the purpose of excluding voxels in the images that are outside of the patient's body. In order to accomplish this, the image processing program module may be configured to set the intensity information for each voxel to a negative value if the voxel is located outside the patient's body. The remaining voxel intensity values may be then capped to a threshold value and then normalized relative to each other. Specifically, voxels may be assigned a value between 0 and 1. Block 410 may be followed by block 415.

At block 415 (Pre-Register Images with Respect to Reference Image), the image processing program module may be configured to pre-register the images with respect to a reference image. The image processing program module may employ various known algorithms to register the series of images with the reference image. Pre-registration may provide an approximate range of motion of various portions of the images, thereby allowing only the relevant parts of the images to be used for further processing. Pre-registration may reduce the computational load significantly on the image processing program module, since certain portions of the images may not experience much motion or movement. Pre-registration may maintain the subset of the reference volume within the possible maximum motion range of the target slice. Block 415 may be followed by 420.

At block 420 (Reference Volume Cropping), the image processing program module may be configured to crop the reference image of the portions of the image that are not of interest. Data from an image segment representing area outside of the patient's body may be of little usefulness, and may be cropped as there may be no need to include such voxel data in applying the above computational models. Cropping the image data may involve removing the voxel data having a negative value. In other embodiments, these operations may occur in a different order. Block 420 may be followed by block 425.

At block 425 (Estimate State and Parameters Using Expectation Maximization in Conjunction with Kalman Filter), the image processing program module may be configured to estimate state and motion parameters using, for example, the dynamical model and the measurement model equations discussed above. More specifically, the estimation of a registration vector may be done using a Kalman filter process along with the estimate of the breathing motion parameters from the M-step in an expectation maximization process. That is, the predicted state of the registration vector at time t may be first computed based on the motion function, e.g., Eq. (2), and the estimated registration vector at t−1. Then, the Kalman gain may be obtained as the product of the predicted covariance, the derivatives of the image transformation function, and the inverse of the innovation covariance. At last, the registration vector at time t may be estimated by adding the predicted state to the product of the Kalman gain and the innovation covariance. Software packages may be adapted for implementing the Kalman filter process with respect to image or other types of data, such as the features extracted from images. Then, the estimate of the motion parameters may be computed by maximizing the expected log-likelihood function and using the estimated registration vectors from the E-step. This may be referred to as the M-step. The E-step and the M-step may iterate until the expected log-likelihood function converges. Block 425 may be followed by block 430.

At block 430 (Use Estimated Registration Vectors and Motion Parameters to Provide 3D Image), once the image processing program module derives the estimated registration vector at the given time and the breathing motion parameters using, for example, the expectation maximization process in conjunction with the Kalman filter process, the image processing program module may be configured to utilize the estimated registration vector to generate an accurately registered 3D image. The rendering of the 3-D image can be accomplished by using, for example, a readily available image rendering software package. After block 430, the process 400 may be repeated (e.g., periodically, continuously, or on-demand as needed) or may terminate.

Once a rendering of the registered 3-D image is obtained, the image may be used by medical personnel in diagnosis of conditions, measuring the efficacy of a treatment regimen, and planning and delivery of radiation therapy. In planning a treatment regimen involving radiation therapy, the radiation treatments plan may define the shape, size, and position of the radiation beam. Radiation treatments may be based on the 3-D image, and these may be referred to as Volume Guide Radiation Therapy ("VGRT"). Treatments that are based on the structure are referred to as Structure Guided Radiation Therapy ("SGRT"). Treatments that may vary the dose of the radiation are termed Dose Guide Radiation Therapy ("DGRT"). Each of these treatments may rely on, and benefit from using, the more accurately registered 3D image produced by iteratively determining the state of the registration vector and the breathing motion parameters. Doing so allows for more precise tuning of the beam shape, position, size, and dose for the detected tumor. In this manner, more effective radiation treatment can be provided.

FIG. 5 is a block diagram illustrating a computer hardware architecture for an example computing system, arranged in accordance with at least some embodiments presented herein. FIG. 5 includes a computer 500, including a processor 510, memory 520, and one or more storage drives 530. The computer 500 may be implemented as an embedded control computer, a laptop, a server computer, a mobile device, or other type of hardware platform that can be utilized to execute any aspect of the methods presented here. In various embodiments, the computer 500 may be integrated with a diagnostic imaging system or can be a stand-alone image processing system receiving image data from the diagnostic imaging system.

The storage drives 530 and their associated computer storage media provide storage of computer readable instructions, data structures, program modules and other data for the computer 500. The storage drives 530 can include an operating system 540, application programs 550, program modules 560, and a database containing image data 580. Some examples of the program modules 560 may include the aforementioned image processing program module 522 that may include the expectation maximization in conjunction with Kalman filtering processing module to process the image data. The mass storage may also store the image data 580.

The computer 500 may further include user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 510 through a user input interface that is coupled to a system bus, but may be coupled by other interface and bus structures, such as a parallel port, game port or a universal serial bus ("USB"). The computer 500 may also include other peripheral output devices such as speakers, which may be coupled through an output peripheral interface 594 or the like.

The computer 500 may operate in a networked environment using logical connections to one or more computers, such as a remote computer coupled to a network interface 596. The remote computer may be a personal computer, a server, a router, a network PC, a peer device or other common network node, and can include many or all of the elements described above relative to the computer 500. Networking environments are commonplace in offices, enterprise-wide area networks ("WAN"), local area networks ("LAN"), intranets, and the Internet.

When used in a LAN or WLAN networking environment, the computer 500 may be coupled to the LAN through the network interface 596 or an adapter. When used in a WAN networking environment, the computer 500 typically includes a modem or other means for establishing communications over the WAN, such as the Internet or the network 514. The WAN may include the Internet, the illustrated network 514, various other networks, or any combination thereof. It will be appreciated that other mechanisms of establishing a communications link, ring, mesh, bus, cloud, or network between the computers may be used.

According to some embodiments, the computer 500 may be coupled to a networking environment. The computer 500 may include one or more instances of a physical computer-readable storage medium or media associated with the storage drives 530 or other storage devices. The system bus may enable the processor 510 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 520, whether characterized as RAM, ROM, flash, or other types of volatile or nonvolatile memory technology. The media may also represent secondary storage, whether implemented as the storage drives 530 or otherwise. Hard drive implementations may be characterized as solid state, or may include rotating media storing magnetically-encoded information.

The storage media may include one or more program modules 560. The program modules 560 may include software instructions that, when loaded into the processor 510 and executed, transform a general-purpose computing system into a special-purpose computing system. As detailed throughout this description, the program modules 560 may provide various tools or techniques by which the computer 500 may participate within the overall systems or operating environments using the components, logic flows, and/or data structures discussed herein.

The processor 510 may be constructed from any number of transistors or other circuit elements, which may individually or collectively assume any number of states. More specifically, the processor 510 may operate as a state machine or finite-state machine. Such a machine may be transformed to a second machine, or specific machine by loading executable instructions contained within the program modules 560. These computer-executable instructions may transform the processor 510 by specifying how the processor 510 transitions between states, thereby transforming the transistors or other circuit elements constituting the processor 510 from a first machine to a second machine The states of either machine may also be transformed by receiving input from the one or more user input devices 590, the network interface 596, other peripherals, other interfaces, or one or more users or other actors. Either machine may also transform states, or various physical characteristics of various output devices such as printers, speakers, video displays, or otherwise.

Encoding the program modules 560 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 560 may transform the physical state of the semiconductor-based memory 520 when the software is encoded therein. For example, the software may transform the state of transistors, capacitors, or other discrete circuit elements constituting the semiconductor-based memory 520.

As another example, the storage media may be implemented using magnetic or optical technology such as storage drives 530. In such implementations, the program modules 560 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
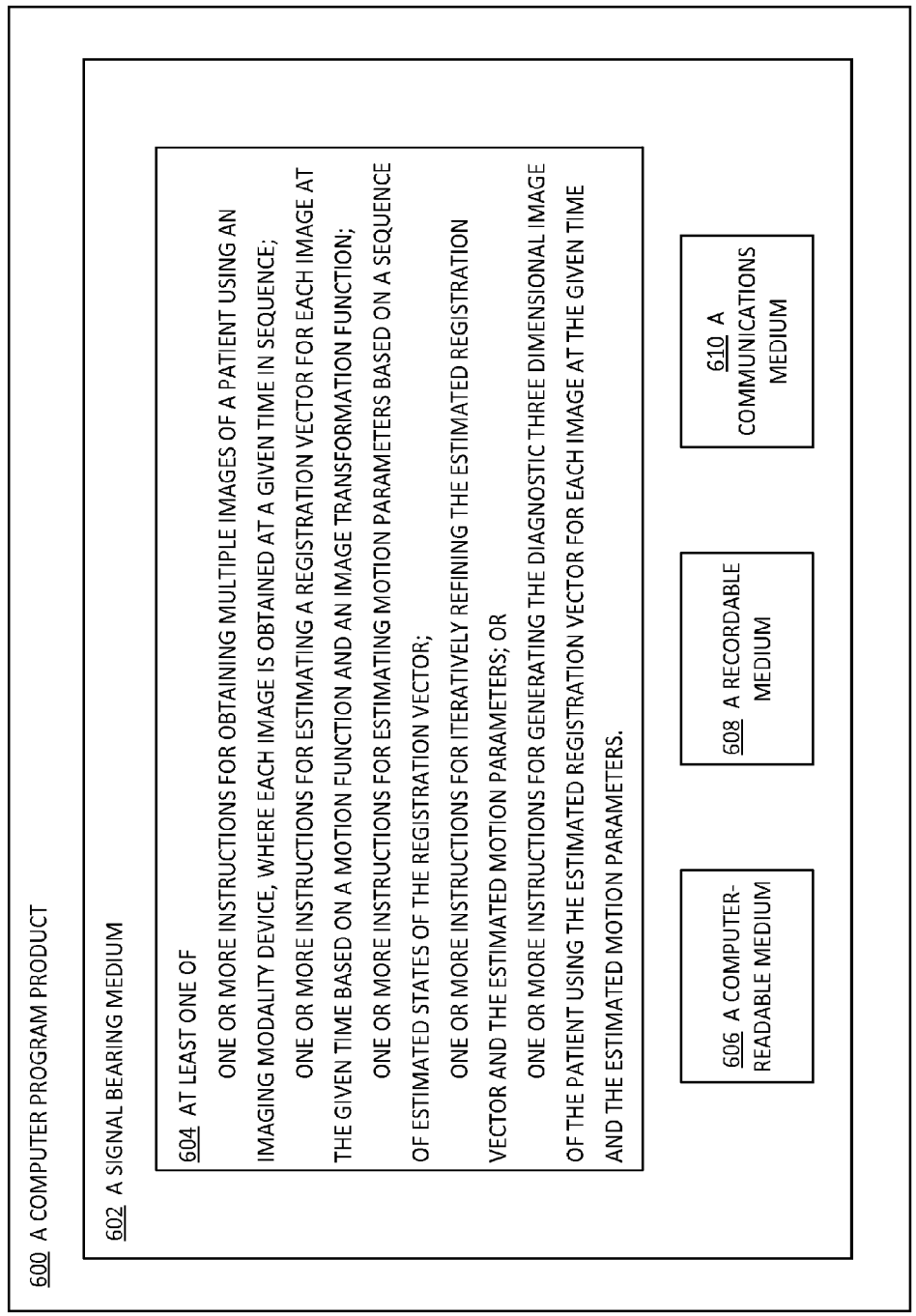
FIG. 6 is a schematic diagram illustrating a computer program product that includes a computer program for executing a computer process on a computing device.

FIG. 6 is a schematic diagram that illustrates a computer program product 600 that includes a computer program for executing a computer process on a computing device, arranged in accordance with at least some embodiments presented herein. An illustrative embodiment of the example computer program product is provided using a signal bearing medium 602, and may include one or more instructions for obtaining multiple images of a patient using an imaging modality device, where each image is obtained at a given time in sequence; one or more instructions for estimating a registration vector for each image at the given time based on a motion function and an image transformation function; one or more instructions for estimating motion parameters based on a sequence of estimated registration vectors; one or more instructions for iteratively refining the estimated registration vectors and the estimated motion parameters; or one or more instructions for generating the diagnostic three dimensional image of the patient using the estimated registration vector for each image at the given time and the estimated motion parameters. In some embodiments, the signal bearing medium 602 of the one or more computer program products 600 includes a computer readable medium 606, a recordable medium 608, and/or a communications medium 610.

The above disclosure illustrates concepts and technologies for estimating the registration vector at a given time and the breathing motion parameters associated with CT image data. The concepts and technologies disclosed herein are not limited to application to CT images, and can be applied to other types of imaging technologies, such as inspection systems for modeling the contents of containers, packages, luggage, etc. Further, the concepts and technologies can be applied to other applications for rendering a model of a target where the target exhibits periodic movement, or using the concepts and technologies in the application of other types of medical treatments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating a diagnostic three dimensional image of a patient comprising:
   obtaining a plurality of images of the patient using an imaging modality device, wherein each of the plurality of images is obtained at a given time in sequence;
   estimating a registration vector for each of the plurality of images at the given time based on a motion function and an image transformation function, wherein each of the plurality of images is defined by a measurement noise occurring at the given time added to the image transformation function operating on the registration vector with respect to a reference image, and wherein the registration vector is a function of a breathing motion of a prior registration vector added to a transition noise value at the given time;
   estimating motion parameters based on a sequence of estimated registration vector;
   iteratively refining the estimated registration vector and the estimated motion parameters; and
   upon iteratively refining the estimated registration vector and the estimated motion parameters, generating the diagnostic three dimensional image of the patient using the estimated registration vector for each of the plurality of images at the given time and the estimated motion parameters.

2. The method of claim 1, wherein the breathing motion is defined as
   the prior registration vector modified by a tidal volume of the patient and further modified by a first model parameter, and
   the prior registration vector modified by an airflow rate of the patient and further modified by a second model parameter, and
   a third model parameter.

3. The method of claim 1, wherein estimating the registration vector at the given time uses a Kalman filter process when the image transformation function is linear.

4. The method of claim 1, wherein estimating the registration vector comprises estimating the registration vector using an extended Kalman filter process when the image transformation function is non-linear.

5. The method of claim 1, wherein estimating the motion parameters comprises estimating the motion parameters using a maximum likelihood process.

6. The method of claim 1, wherein iteratively refining the estimated registration vector and the estimated motion parameters comprises iteratively refining the estimated registration vector and the estimated motion parameters using an expectation maximization process.

7. The method of claim 1, wherein the imaging modality device comprises a computed tomography system, X-ray system, a nuclear imaging system, magnetic resonance imaging system, or an ultrasound system.

8. The method of claim 1, further comprising pre-processing the plurality of images to crop image data not representative of the patient's body.

9. The method of claim 8, further comprising registering the plurality of images to the reference image using a plurality of control points identified on the reference image.

10. The method of claim 1, wherein the reference image comprises a first image in the plurality of images.

11. The method of claim 1, wherein the reference image comprises a previous image separate from the plurality of images.

12. A system for generating a diagnostic three dimensional image of a patient comprising:
   a non-invasive imaging device configured to obtain a plurality of images of the patient using an imaging modality device, wherein each of the plurality of images is obtained at a given time in sequence;
   a processor and a memory coupled to the processor; and
   a diagnostic imaging module which executes in the processor from the memory and which, when executed by the processor, causes the processor to
      estimate a registration vector for each of the plurality of images at the given time based on a motion function and an image transformation function, wherein each of the plurality of images is defined by a measurement noise occurring at the given time added to the image transformation function operating on the registration vector with respect to a reference image, and wherein the registration vector is a function of an estimated breathing motion of a prior registration vector added to a transition noise value at the given time,
      estimate motion parameters based on a sequence of estimated registration vector;

iteratively refine the estimated registration vector and the estimated motion parameters; and when the estimated registration vector and the estimated motion parameters have been iteratively refined, generate the diagnostic three dimensional image of the patient using the estimated registration vector for each of the plurality of images at the given time and the estimated motion parameters.

13. The system of claim 12, further comprising a display device configured to present the diagnostic three dimensional image.

14. The system of claim 12, wherein the motion function is defined by $\alpha\rho(t-1)V+\beta\rho(t-1)\epsilon+\gamma$, where V is a tidal volume of the patient, $\epsilon$ is an airflow rate of the patient, $\gamma$ is a constant, and $\rho(t-1)$ is the prior registration vector, and wherein the diagnostic imaging module, when executed by the processor, further causes the processor to estimate parameters $\alpha$, $\beta$, and $\gamma$.

15. The system of claim 12, wherein the non-invasive imaging device comprises a computed tomography imaging device, X-ray imaging device, a nuclear imaging device, magnetic resonance imaging device, or an ultrasound imaging device.

16. The system of claim 12, wherein the diagnostic imaging module, when executed by the processor, further causes the processor to process the plurality of images to crop image data not representative of the patient's body.

17. The system of claim 12, wherein the diagnostic imaging module, when executed by the processor, further causes the processor to register the plurality of images to the reference image using a plurality of control points identified on the reference image.

18. The system of claim 12, wherein the diagnostic imaging module, when executed by the processor, further causes the processor to estimate the registration vector for the respective time using a Kalman filter process when the image transformation function is linear.

19. The system of claim 12, wherein the diagnostic imaging module, when executed by the processor, further causes the processor to estimate the registration vector for the respective time using an extended Kalman filter process when the image transformation function is non-linear.

20. The system of claim 12, wherein the diagnostic imaging module, when executed by the processor, further causes the processor to estimate the motion parameters using a maximum likelihood process.

21. The system of claim 12, wherein the diagnostic imaging module, when executed by the processor, further causes the processor to iteratively refine the estimated registration vector and the estimated motion parameters using an expectation maximization process.

22. The system of claim 12, wherein the diagnostic imaging module, when executed by the processor, further causes the processor to determine a radiation therapy dosage for the patient based on the diagnostic three dimensional image of the patient.

23. A non-transitory computer-readable medium having computer-executable instructions stored thereon which, when executed by a computer, cause the computer to:

obtain a plurality of images of a patient using an imaging modality device, wherein each of the plurality of images is obtained at a given time in sequence;

estimate a registration vector for each of the plurality of images at the given time based on a motion function and an image transformation function, wherein each of the plurality of images is defined by a measurement noise occurring at the given time added to the image transformation function operating on the registration vector with respect to a reference image, and wherein the registration vector is a function of an estimated breathing motion of a prior registration vector added to a transition noise value at the given time;

estimate motion parameters based on a sequence of estimated registration vector;

iteratively refine the estimated registration vector and the estimated motion parameters; and when the estimated registration vector and the estimated motion parameters have been iteratively refined, generate a full volume reference diagnostic image of the patient using the estimated registration vector for each of the plurality of images at the given time and the estimated motion parameters.

24. The non-transitory computer-readable medium of claim 23 having further computer-executable instructions stored thereon which, when executed by the computer, cause the computer to pre-process the plurality of images to crop image data not representative of the patient's body.

25. The non-transitory computer-readable medium of claim 23 having further computer-executable instructions stored thereon which, when executed by the computer, cause the computer to register the plurality of images to the reference image using a plurality of control points identified on the reference image.

26. The non-transitory computer-readable medium of claim 23 having further computer-executable instructions stored thereon which, when executed by the computer, cause the computer to estimate the registration vector using a standard Kalman filter process when the image transformation function is a linear function.

27. The non-transitory computer-readable medium of claim 23 having further computer-executable instructions stored thereon which, when executed by the computer, cause the computer to estimate the registration vector using an extended Kalman filter process when the image transformation function is a non-linear function.

28. The non-transitory computer-readable medium of claim 23 having further computer-executable instructions stored thereon which, when executed by the computer, cause the computer to estimate the motion parameters using a maximum likelihood process.

29. The non-transitory computer-readable medium of claim 23 having further computer-executable instructions stored thereon which, when executed by the computer, cause the computer to iteratively refine the estimates of the estimated registration vector and the estimated motion parameters using an expectation maximization process.

30. A method for forming a radiation treatment plan comprising:

obtaining a plurality of images of a patient using an imaging modality device, wherein each of the plurality of images is obtained at a given time in sequence;

estimating a registration vector for each of the plurality of images at the given time based on a motion function and an image transformation function, wherein each of the plurality of images is defined by a measurement noise occurring at the given time added to the image transformation function operating on the registration vector with respect to a reference image, and wherein the registration vector is a function of an estimated breathing motion of a prior registration vector added to a transition noise value at the given time;

estimating motion parameters based on a sequence of estimated registration vector;

iteratively refining the estimated registration vector and the estimated motion parameters; and upon iteratively refining the estimated registration vector and the estimated motion parameters, generating a full volume reference diagnostic image of the patient using the estimated registration vector for each of the plurality of images at the given time and the estimated motion parameters; and determining a radiation dosage of a radiation beam that is applied to the patient based on the full volume reference diagnostic image, wherein the radiation dosage of the radiation beam forms at least part of the radiation treatment plan.

31. The method of claim 30, wherein estimating the registration vector comprises estimating the registration vector using either a standard Kalman filter process or an extended Kalman filter process depending on whether the image transformation function is linear or non-linear.

* * * * *

UNITED STATES PATENT AND TRADEMARK OFFICE
CERTIFICATE OF CORRECTION

| | | |
|---|---|---|
| PATENT NO. | : 8,655,040 B2 | Page 1 of 1 |
| APPLICATION NO. | : 13/808159 | |
| DATED | : February 18, 2014 | |
| INVENTOR(S) | : Henry Leung | |

It is certified that error appears in the above-identified patent and that said Letters Patent is hereby corrected as shown below:

In the Specification:

In Column 9, Line 31, delete "variational Baycsian." and insert -- variational Bayesian. --, therefor.

In Column 13, Line 9, delete "machine" and insert -- machine. --, therefor.

Signed and Sealed this
First Day of July, 2014

Michelle K. Lee
*Deputy Director of the United States Patent and Trademark Office*